(12) United States Patent
Fowler et al.

(10) Patent No.: US 9,855,682 B2
(45) Date of Patent: Jan. 2, 2018

(54) METHODS OF RECYCLING SYNTHETIC TURF, METHODS OF USING RECLAIMED SYNTHETIC TURF, AND PRODUCTS COMPRISING SAME

(75) Inventors: Gregory Fowler, Rocky Face, GA (US); John J. M. Rees, Chattanooga, TN (US); David A. Moore, Dalton, GA (US)

(73) Assignee: Columbia Insurance Company, Omaha, NE (US)

( * ) Notice: Subject to any disclaimer, the term of this patent is extended or adjusted under 35 U.S.C. 154(b) by 386 days.

(21) Appl. No.: 13/493,675

(22) Filed: Jun. 11, 2012

(65) Prior Publication Data

US 2012/0315816 A1 Dec. 13, 2012

Related U.S. Application Data

(60) Provisional application No. 61/495,607, filed on Jun. 10, 2011.

(51) Int. Cl.
*B29B 17/00* (2006.01)
*B32B 5/02* (2006.01)
*B32B 5/24* (2006.01)
*B29L 31/00* (2006.01)

(52) U.S. Cl.
CPC .......... *B29B 17/0042* (2013.01); *B32B 5/022* (2013.01); *B32B 5/245* (2013.01); *B29L 2031/732* (2013.01); *B32B 2262/0253* (2013.01); *B32B 2262/0276* (2013.01); *B32B 2264/102* (2013.01); *B32B 2264/104* (2013.01); *B32B 2266/0278* (2013.01); *B32B 2307/3065* (2013.01); *B32B 2581/00* (2013.01);

(Continued)

(58) Field of Classification Search
CPC ............ B29B 17/0042; B29B 17/0026; B29B 17/0036; B29B 17/02; B29B 2017/0213; B29B 2017/0217; B32B 5/245; B32B 5/022; B32B 2262/0253; B32B 2307/3065; B32B 2266/0278; B32B 2262/0276; B32B 2581/00; B32B 2264/104; B32B 2264/102; Y02P 20/582; Y02W 30/62; Y10T 428/249953; Y10T 442/60; B29L 2031/732

See application file for complete search history.

(56) References Cited

U.S. PATENT DOCUMENTS

| | | |
|---|---|---|
| 3,551,263 A | 12/1970 | Carter et al. |
| 3,565,910 A | 2/1971 | Elbert et al. |
| 3,573,147 A | 3/1971 | Elbert |

(Continued)

FOREIGN PATENT DOCUMENTS

| | | |
|---|---|---|
| CN | 101424068 A | 5/2009 |
| DE | 4136444 * | 5/1993 |

(Continued)

OTHER PUBLICATIONS

U.S. Appl. No. 61/495,607, filed Jun. 10, 2011, Fowler (Shaw Industries Group).

*Primary Examiner* — Jeffrey Wollschlager
(74) *Attorney, Agent, or Firm* — Ballard Spahr LLP

(57) ABSTRACT

Disclosed are methods for utilizing reclaimed synthetic turf materials in the manufacture of various second generation floor coverings and floor covering components. Also disclosed are products manufactured by the methods.

15 Claims, 1 Drawing Sheet

(52) U.S. Cl.
CPC ............. *Y02P 20/582* (2015.11); *Y02W 30/62* (2015.05); *Y10T 428/249953* (2015.04); *Y10T 442/60* (2015.04)

(56) References Cited

U.S. PATENT DOCUMENTS

| | | | |
|---|---|---|---|
| 3,597,297 A | 8/1971 | Buchholtz et al. | |
| 3,837,980 A | 9/1974 | Nishimura | |
| 4,230,752 A | 10/1980 | Benedyk | |
| 4,857,566 A | 8/1989 | Helbling | |
| 4,921,890 A | 5/1990 | Hayashi et al. | |
| 5,045,598 A | 9/1991 | Duez et al. | |
| 5,098,787 A | 3/1992 | Komatsu et al. | |
| 5,104,693 A | 4/1992 | Jenkines | |
| 5,288,349 A * | 2/1994 | Fink | 156/72 |
| 5,371,156 A | 12/1994 | Komatsu et al. | |
| 5,700,895 A | 12/1997 | Kanda et al. | |
| 5,859,071 A * | 1/1999 | Young et al. | 521/40.5 |
| 6,059,207 A * | 5/2000 | Costello | B03B 9/061 241/157 |
| 6,156,838 A | 12/2000 | Yoshikawa et al. | |
| 6,207,077 B1 | 3/2001 | Burnell-Jones | |
| 6,432,505 B1 | 8/2002 | Sweenie et al. | |
| 6,680,353 B1 | 1/2004 | Kato et al. | |
| 6,747,077 B2 | 6/2004 | Gugumus et al. | |
| 6,761,970 B2 | 7/2004 | Ochi et al. | |
| 6,814,826 B1 * | 11/2004 | Bell | 156/94 |
| 6,815,059 B2 | 11/2004 | Slootweg et al. | |
| 6,828,364 B2 | 12/2004 | Gugumus | |
| 6,878,761 B2 | 4/2005 | Gugumus | |
| 6,881,793 B2 | 4/2005 | Sheldon et al. | |
| 6,936,201 B2 * | 8/2005 | Desai | B29B 17/0026 264/112 |
| 7,026,031 B2 | 4/2006 | Holeschovsky et al. | |
| 7,261,867 B1 | 8/2007 | Sandford et al. | |
| 7,267,884 B2 | 9/2007 | Chou et al. | |
| 7,288,585 B2 | 10/2007 | Moad et al. | |
| 7,375,149 B2 | 5/2008 | Rotzinger et al. | |
| 7,399,514 B2 | 7/2008 | De Clerck | |
| 7,423,088 B2 | 9/2008 | Mader et al. | |
| 7,476,713 B2 | 1/2009 | Hild et al. | |
| 7,560,502 B2 | 7/2009 | Gerster et al. | |
| 7,579,396 B2 | 8/2009 | Blanton et al. | |
| 7,595,008 B2 | 9/2009 | Gugumus | |
| 7,611,763 B2 | 11/2009 | Atsma et al. | |
| 7,645,521 B2 | 1/2010 | Wevers et al. | |
| 7,655,212 B2 | 2/2010 | Sandford et al. | |
| 7,695,794 B2 | 4/2010 | Oosterbroek et al. | |
| 7,723,412 B2 | 5/2010 | Wermter et al. | |
| 7,723,418 B2 | 5/2010 | Okamoto | |
| 8,017,662 B2 * | 9/2011 | Hoover, Jr. | B29B 17/0042 156/72 |
| 8,110,131 B1 * | 2/2012 | Dell'Orco et al. | 264/141 |
| 8,113,448 B2 * | 2/2012 | Keating | B03B 9/061 241/22 |
| 8,360,348 B2 * | 1/2013 | Levy | B02C 23/02 241/186.35 |
| 8,870,104 B2 * | 10/2014 | Levy | B03B 9/061 241/24.19 |
| 2001/0009710 A1 * | 7/2001 | Zegler et al. | 428/85 |
| 2002/0039636 A1 * | 4/2002 | Fink et al. | 428/85 |
| 2004/0144075 A1 * | 7/2004 | Jackson | A01D 34/13 56/257 |
| 2004/0229988 A1 | 11/2004 | Thai et al. | |
| 2005/0049336 A1 | 3/2005 | Gugumus | |
| 2005/0203232 A1 | 9/2005 | Rolland et al. | |
| 2005/0203258 A1 | 9/2005 | Kimura et al. | |
| 2006/0013989 A1 * | 1/2006 | Stull | A41G 1/009 428/95 |
| 2006/0093783 A1 | 5/2006 | De Clerck | |
| 2006/0159917 A1 | 7/2006 | Verleyen | |
| 2006/0258811 A1 | 11/2006 | Barcus et al. | |
| 2007/0032581 A1 | 2/2007 | Stoll et al. | |
| 2007/0037940 A1 | 2/2007 | Lazzari et al. | |
| 2007/0043128 A1 * | 2/2007 | Jenkines et al. | 521/40 |
| 2007/0049694 A1 | 3/2007 | Koch et al. | |
| 2007/0072979 A1 | 3/2007 | Moad et al. | |
| 2007/0141323 A1 | 6/2007 | Wevers et al. | |
| 2007/0149663 A1 | 6/2007 | Schmidt et al. | |
| 2007/0166507 A1 | 7/2007 | Atsma et al. | |
| 2007/0275207 A1 * | 11/2007 | Higgins et al. | 428/95 |
| 2008/0039558 A1 | 2/2008 | Lazzari et al. | |
| 2008/0090955 A1 | 4/2008 | Lambert et al. | |
| 2008/0113146 A1 * | 5/2008 | Wright et al. | 428/95 |
| 2008/0114130 A1 | 5/2008 | Ashbaugh et al. | |
| 2008/0128933 A1 * | 6/2008 | Przybylinski et al. | 264/31 |
| 2008/0187689 A1 | 8/2008 | Dierkens et al. | |
| 2008/0213515 A1 | 9/2008 | Vey et al. | |
| 2008/0260974 A1 | 10/2008 | Morton-Finger | |
| 2008/0260975 A1 | 10/2008 | Morton-Finger | |
| 2008/0269382 A1 | 10/2008 | Gerster et al. | |
| 2009/0008824 A1 | 1/2009 | Satori et al. | |
| 2009/0029098 A1 | 1/2009 | Ashbaugh et al. | |
| 2009/0041956 A1 | 2/2009 | Gilman et al. | |
| 2009/0082476 A1 * | 3/2009 | Hoover, Jr. | B29B 17/0042 521/47 |
| 2009/0111719 A1 | 4/2009 | Stoll et al. | |
| 2009/0155614 A1 | 6/2009 | McLeod et al. | |
| 2009/0162578 A1 | 6/2009 | Van Balen et al. | |
| 2009/0253838 A1 | 10/2009 | Gerster et al. | |
| 2009/0275690 A1 | 11/2009 | Weaver et al. | |
| 2009/0298978 A1 | 12/2009 | Rotzinger | |
| 2009/0306299 A1 | 12/2009 | Kipke et al. | |
| 2009/0326145 A1 | 12/2009 | Gerster et al. | |
| 2010/0009100 A1 | 1/2010 | Van Reijen | |
| 2010/0010135 A1 | 1/2010 | Brand et al. | |
| 2010/0028568 A1 | 2/2010 | Weaver et al. | |
| 2010/0029827 A1 | 2/2010 | Ansems et al. | |
| 2010/0029844 A1 | 2/2010 | Fink et al. | |
| 2010/0040809 A1 | 2/2010 | Muller et al. | |
| 2010/0055358 A1 | 3/2010 | Weaver et al. | |
| 2010/0069557 A1 | 3/2010 | Moad et al. | |
| 2010/0143651 A1 | 6/2010 | Silvis et al. | |
| 2010/0151158 A1 * | 6/2010 | Mashburn et al. | 428/17 |
| 2010/0247814 A1 * | 9/2010 | Nisikawa et al. | 428/17 |
| 2010/0267304 A1 | 10/2010 | Fowler | |
| 2010/0319510 A1 * | 12/2010 | Bearden | A01B 45/045 83/155 |
| 2011/0045211 A1 * | 2/2011 | Zhang et al. | 428/17 |
| 2012/0263891 A1 * | 10/2012 | Rodgers | A01G 1/002 428/17 |
| 2012/0309858 A1 * | 12/2012 | Taylor | B09B 5/00 521/49 |

FOREIGN PATENT DOCUMENTS

| | | |
|---|---|---|
| DE | 19540129 A1 | 4/1997 |
| EP | 1457600 A1 | 9/2004 |
| EP | 1705291 | 9/2006 |
| JP | 50063273 A | 5/1975 |
| JP | 50118012 A | 9/1975 |
| JP | 54071146 | 6/1979 |
| JP | 56004712 A | 1/1981 |
| JP | 61275421 A | 12/1986 |
| JP | 6330430 A | 11/1994 |
| JP | 9087960 A | 3/1997 |
| JP | 9111532 A | 4/1997 |
| JP | 9220781 A | 8/1997 |
| JP | 9268514 A | 10/1997 |
| JP | 2000027113 A | 1/2000 |
| JP | 2003313737 A | 11/2003 |
| JP | 2004238774 A | 8/2004 |
| JP | 2004324018 A | 11/2004 |
| KR | 20080032967 A | 4/2008 |
| KR | 2009124411 | * 12/2009 |
| MX | 2007011805 A | 3/2008 |
| WO | WO-2004/077914 A2 | 9/2004 |
| WO | WO-2006/100543 A1 | 9/2006 |
| WO | WO-2006/131417 A1 | 12/2006 |
| WO | WO-2009/005375 A1 | 1/2009 |
| WO | WO-2009/028931 A1 | 3/2009 |
| WO | WO-2009/055990 A1 | 5/2009 |

(56) References Cited

FOREIGN PATENT DOCUMENTS

| | | | |
|---|---|---|---|
| WO | WO2009055990 | * | 5/2009 |
| WO | WO2009078128 | * | 6/2009 |
| WO | WO-2009/146438 A1 | | 12/2009 |
| WO | WO-2010/018027 A1 | | 2/2010 |
| WO | WO-2010/060678 A1 | | 6/2010 |

* cited by examiner

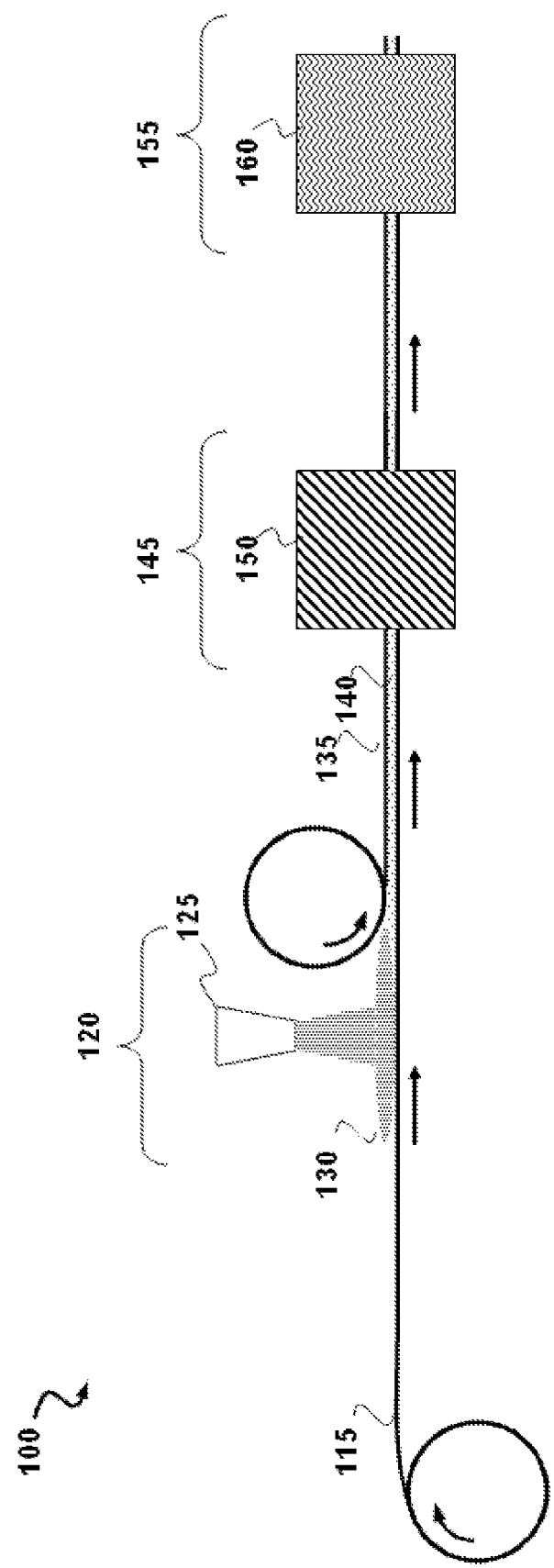

METHODS OF RECYCLING SYNTHETIC TURF, METHODS OF USING RECLAIMED SYNTHETIC TURF, AND PRODUCTS COMPRISING SAME

CROSS-REFERENCE TO RELATED APPLICATIONS

This application claims priority to U.S. Provisional Patent Application No. 61/495,607, filed on Jun. 10, 2011, which is hereby incorporated by reference herein in its entirety.

FIELD

The present invention relates generally to methods of using reclaimed synthetic turf material in the manufacture of various extrudates, composite foams, composite fiber pads and batts, infill, and high density composites. Also provided are the products produced by the disclosed methods.

BACKGROUND

Synthetic turf has been used for years in athletic playing surfaces such as football, baseball, and soccer fields, and has more recently been used in other applications where an alternative to natural grass is desired. These applications include at least playgrounds, residential and commercial lawns and other landscaping, jogging paths, paintball fields, tennis courts, putting greens, and dog runs. Typically, synthetic turf includes a pile fabric having a backing and a plurality of upstanding ribbons, also called face fibers or filiform formations, resembling grass. Many synthetic turf products also include an infill material dispersed among the upstanding ribbons, which may consist of sand, tire rubber crumb, or other particulates, either singularly or in combination with each other. The infill material simulates the soil in natural turf, acts as a ballast, and/or contributes to the physical properties of the turf, such as resiliency, that make the turf suitable for a particular use.

Synthetic turf has a limited useful life, the length of which depends on the construction of the turf, the application for which it is used, and how the turf is maintained. As an example, a typical synthetic turf for use as an athletic field may have a useful life of from about 8 to 15 years. A large amount of synthetic turf is currently being used in thousands of athletic fields and in other applications. To avoid sending that turf to landfills at the end of its useful life, there is a need for a method of recycling and reusing all or portions of the synthetic turf. There is also a need for a synthetic turf that is recyclable.

SUMMARY

The present invention provides a variety of methods for recycling synthetic turf material. In some embodiments, reclaimed synthetic turf material is first size reduced into smaller turf fragments using any conventional method for size reduction, including, for example and without limitation, shearing, shredding, and grinding methods. According to some embodiments the turf fragments are subjected to an agglomeration process. In other embodiments, the turf fragments are fed directly into an extrusion process to form extrudates of various forms. In still further embodiments, the agglomerated fragments are fed directly into an extrusion process. The resulting extrudates can be stored for future use or, alternatively, can be used in the manufacture of second generation products.

In some embodiments, the present invention provides several methods for incorporating reclaimed synthetic turf material into virgin polyurethane foam compositions to form a composite polyurethane foam material comprising reclaimed synthetic turf material distributed within the polyurethane foam. Also provided according to these embodiments are various foam compositions comprising reclaimed synthetic turf material as a filler therein.

In other embodiments, the present invention provides several methods whereby reclaimed synthetic turf material can be used to manufacture non-woven fiber pads and fiber batts. Also provided according to these embodiments are the various fiber pads and batts that can be produced by the inventive methods.

In further embodiments, the present invention provides a variety of methods for using reclaimed synthetic turf material in the manufacture of relatively high density composites, which can be used, for example, as a floor covering, decking, or wall covering. In one embodiment, the method generally comprises providing a composite layer of reclaimed synthetic turf material and low melt thermoplastic binder resin and then heating the composite layer at a temperature sufficient to melt the thermoplastic binder resin. The heated composite can then be subjected to pressure sufficient to substantially consolidate the melted binder and reclaimed turf material and to form a composite having a desired density and thickness. In another embodiment, the method generally comprises providing a composite layer of reclaimed synthetic turf material, wherein a portion of the reclaimed turf material comprises polypropylene, and heating the composite layer at a temperature sufficient to melt at least a portion of the polypropylene. The heated composite can again be subjected to pressure sufficient to substantially consolidate the melted binder and reclaimed turf material and to form a composite having a desired density and thickness. In still further embodiments, the present invention provides the composites that can be manufactured from the summarized methods. For example, the present invention provides a high-density composite comprising reclaimed synthetic turf material, wherein the composite has a density of from 10 to 100 pounds per cubic foot.

Still further embodiments of the present invention provide methods for manufacturing infill for a synthetic turf. The infill can comprise either reclaimed carpet material, reclaimed synthetic turf material, or a combination thereof.

Additional embodiments of the invention will be set forth, in part, in the detailed description, figures, and claims which follow, and in part will be derived from the detailed description, or can be learned by practice of the invention. It is to be understood that both the foregoing general description and the following detailed description are exemplary and explanatory only and are not restrictive of the invention as disclosed.

DETAILED DESCRIPTION

The present invention can be understood more readily by reference to the following detailed description, examples, drawings, and claims, and their previous and following description. However, before the present articles, systems, and/or methods are disclosed and described, it is to be understood that this invention is not limited to the specific or exemplary embodiments of articles, systems, and/or methods disclosed unless otherwise specified, as such can, of course, vary. It is also to be understood that the terminology used herein is for the purpose of describing particular embodiments only and is not intended to be limiting.

The following description of the invention is provided as an enabling teaching of the invention in its best, currently known embodiment. To this end, those skilled in the relevant art will recognize and appreciate that many changes can be made to the various embodiments of the invention described herein, while still obtaining the beneficial results of the present invention. It will also be apparent that some of the desired benefits of the present invention can be obtained by selecting some of the features of the present invention without utilizing other features. Accordingly, those of ordinary skill in the pertinent art will recognize that many modifications and adaptations to the present invention are possible and may even be desirable in certain circumstances and are a part of the present invention. Thus, the following description is again provided as illustrative of the principles of the present invention and not in limitation thereof.

As used herein, the singular forms "a," "an" and "the" include plural referents unless the context clearly dictates otherwise. Thus, for example, reference to a "reclaimed carpet material" includes embodiments having two or more such reclaimed carpet materials unless the context clearly indicates otherwise.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It should be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

References in the specification and concluding claims to parts by weight of a particular element or component in a composition or article, denotes the weight relationship between the element or component and any other elements or components in the composition or article for which a part by weight is expressed. Thus, in a composition or a selected portion of a composition containing 2 parts by weight of component X and 5 parts by weight component Y, X and Y are present at a weight ratio of 2:5, and are present in such ratio regardless of whether additional components are contained in the composition.

A weight percent of a component, unless specifically stated to the contrary, is based on the total weight of the formulation or composition in which the component is included.

As used herein, and unless the context clearly indicates otherwise, the term "carpet" is used to generically include broadloom carpet, carpet tiles, and even area rugs. To that end, the term "broadloom carpet" refers to a broadloom textile flooring product manufactured for and intended to be used in roll form. The term "carpet tile" refers to a modular floor covering, conventionally manufactured in 18 inch×18 inch, 24 inch×24 inch or 36 inch×36 inch squares, but other sizes and shapes are also within the scope of the present invention. Any of these exemplary carpets can be woven, non-woven, tufted, or needle-punched.

As used herein, "reclaimed carpet material" refers generally to any material obtained from a prior manufactured carpet product. The prior manufactured carpet product can be a post consumer product, such as, for example, a post residential, post commercial, post industrial carpet. Alternatively, the reclaimed carpet material can be a pre-consumer product, such as manufacturing remnants or quality control failures. The reclaimed carpet material can comprise any material that is conventionally used in carpet manufacture. For example, the reclaimed carpet material can be synthetic, such as, for example a material comprising one or more of a conventional nylon, polyester, polypropylene (PP), polyethylene (PE), polyurethane (PU), polyvinyl chloride (PVC), polyethylene terephthalate (PET), polytrimethylene terephthalate (PTT), latex, styrene butadiene rubber, or any combination thereof. It is contemplated that the conventional nylon of the reclaimed carpet material can be, for example and without limitation, nylon 6/6, nylon 6, nylon 10, nylon 10/10, nylon 10/11, nylon 11, and the like. Additionally, the reclaimed carpet material can comprise natural fibers, such as cotton, wool, or jute. In exemplary embodiments, the reclaimed carpet material can comprise one or more biodegradable materials, including, for example and without limitation, polylactic acid (PLA). According to embodiments of the invention, a reclaimed carpet material comprising synthetic and/or natural materials described above can optionally be present as a reclaimed carpet fiber. Any one or more of the above disclosed materials can be obtained from various component parts of the prior manufactured carpet product, for example and without limitation, a reclaimed carpet material can be obtained from a face layer, an adhesive layer, a backing layer, a secondary backing layer, an underlayment, a cushioning material, a reinforcing layer, or a scrim.

Additionally, the reclaimed carpet material can also comprise fillers. The fillers can be any suitable filler, including, for example, aluminum oxide trihydrate (alumina), calcium carbonate, barium sulfate or mixtures thereof. The fillers can be virgin filler, waste material, or even reclaimed fillers. Examples of recycled fillers include coal fly ash and calcium carbonate.

The reclaimed carpet material can be obtained from a variety of sources. In one example, the reclaimed carpet material can be obtained from a collection site. Approximately 50 collection sites are positioned throughout the United States. These collection sites take in post consumer carpet which is then shipped to a facility for sorting according to fiber type. Once sorted, baled material of primarily the same or similar fiber type is then shipped to a secondary location where various techniques are employed for reducing the large pieces of carpet to small chunks or shredded fiber and to provide an amalgamated mixture. The amalgamated mixture will typically contain face fibers, primary backing, secondary backing, carpet binder and, in some cases, attached cushion. After this stage, the product can be used with or without further refinement or processing to remove additional contaminates.

For use in connection with various embodiments of the present invention and, dependant on the end use and desired cost of the product, reclaimed carpet material can comprise a relatively coarse blend of ground or shredded post consumer carpet (PCC) or a more refined less coarse material containing primarily opened carpet face fibers. According to some embodiments, the reclaimed carpet material can for example comprise relatively coarse slit tape fibers derived from reclaimed primary and secondary backing materials. The coarse material is able to provide a low-cost structural reinforcement material that can serve as reinforcement for both molded products as well as foam and fiber pad products described herein. In some embodiments, additional processing steps can be desirable. For example, the post consumer carpet material can be further chopped or sheared into any desired size, including for example, fiber or tape yarn lengths in the range of from about 1/64 inch to about 3 inches.

According to certain embodiments, the fibrous material present within the reclaimed carpet material exhibits a substantially uniform size, including substantially uniform liner density measured in denier units and substantially uniform fiber lengths. However, in alternative embodiments, fibers present within the reclaimed carpet material can have non-uniform linear densities and non-uniform fiber lengths. According to these embodiments, a population of reclaimed carpet fibers having non-uniform linear fiber densities can, for example, have individual linear fiber densities in the range of from about 1 to about 1,500 denier per filament (DPF). Still further, a population of reclaimed carpet fibers having non-uniform linear density can collectively provide an average linear fiber density that is, for example, greater than 1 DPF, greater than 10 DPF, greater than 50 DPF, greater than 100 DPF, greater than 500 DPF, greater than 1,000 DPF, or even greater than 1,500 DPF.

In addition to fibrous reclaimed carpet material described above, it should be appreciated that reclaimed carpet material can further comprise one or more impurities. For example, representative impurities that can be present in reclaimed carpet material and thus present in the articles described herein include dirt, sand, oil, inorganic filler, and other conventionally known waste materials that can be present in reclaimed carpet material.

As used herein the term "synthetic turf" includes any form of artificial grass or turf conventionally used, for example, in athletic playing surfaces such as football, baseball, and soccer fields, and in other applications where an alternative to natural grass is desired. These applications include at least playgrounds, residential and commercial lawns and other landscaping, jogging paths, paintball fields, tennis courts, putting greens, dog runs, landfill covers, medians and other areas near roadways, and airport grounds near runways.

As described in detail in U.S. Patent Application Publication US2010/00151158, the entire disclosure of which is incorporated herein by reference, conventional synthetic turf typically includes a pile fabric having a backing and a plurality of upstanding ribbons, also called face fibers or filiform formations, resembling blades of grass. Typically, the upstanding ribbons are made of polyethylene, polypropylene or a blend thereof. The ribbons may also be made of nylon or any other material known in the art alone or in combination with polypropylene and/or polyethylene. These face fibers are tufted or sewn into a primary backing material which can be made of a number of different materials including, but not limited to, polypropylene and polyester. An adhesive coating material, or precoat, is commonly applied to the fiber and primary backing to hold the face fibers in place. In some embodiments, the primary coating of synthetic turfs includes polyurethane and also typically includes a filler such as calcium carbonate or coal fly ash. The primary coatings may also include latex, hot melt adhesives, and/or thermoplastics in addition to or instead of polyurethane. Synthetic turfs may also have a secondary coating which may be similar to the primary coating described herein. Synthetic turfs may also have a secondary backing which can be made of a number of different materials including, but not limited to, polypropylene and polyester.

The face fibers typically make up from about 19 wt % to about 80 wt % of a synthetic turf. The primary backing typically makes up from about 1 wt % to about 25 wt % of a synthetic turf. The primary coating typically makes up from about 15 wt % to about 80 wt % of a synthetic turf.

The face fibers may include any material that is conventionally used in carpet manufacture, singly or in combination with other such materials. For example, the face fibers can be synthetic, such as, for example a material comprising one or more of a conventional nylon, polyester, polypropylene (PP), polyethylene (PE), polyurethane (PU), polyvinyl chloride (PVC), polyethylene terephthalate (PET), polytrimethylene terephthalate (PTT), latex, styrene butadiene rubber, or any combination thereof. It is contemplated that the conventional nylon of the face fibers can be, for example and without limitation, nylon 6/6, nylon 6, nylon 10, nylon 10/10, nylon 10/11, nylon 11, and the like. Additionally, the face fibers can comprise natural fibers, such as cotton, wool, or jute. In exemplary embodiments, the face fibers can comprise one or more biodegradable materials, including, for example and without limitation, polylactic acid (PLA).

In exemplary embodiments, the face fibers may include from about 0 wt % to about 100 wt % polyethylene, from about 0 wt % to about 100 wt % polypropylene, and from about 0 wt % to about 100 wt % nylon. In some embodiments, the face fibers include blends of polypropylene (PP) and polyethylene (PE) in any of the following ratios of PP:PE—5:95; 10:90; 50:50; 90:10; 95:5 or any ratio that is within these ranges of ratios. In some embodiments, the face fibers include blends of PP and nylon in any of the following ratios of PP:nylon—5:95; 10:90; 50:50; 90:10; 95:5 or any ratio that is within these ranges of ratios. In some embodiments, the face fibers include blends of PE and nylon in any of the following ratios of PE:nylon—5:95; 10:90; 50:50; 90:10; 95:5 or any ratio that is within these ranges of ratios. In some embodiments, the face fibers include blends of PP, PE, and nylon in any of the following ratios of PP:PE:nylon—10:10:80; 10:80:10; 80:10:10; 33:33:33 or any ratio that is within these ranges of ratios.

The primary backing may include any material that is conventionally used in carpet manufacture, singly or in combination with other such materials. For example, the primary backing can be synthetic, such as, for example a material comprising one or more of a conventional nylon, polyester, polypropylene (PP), polyethylene (PE), polyurethane (PU), polyvinyl chloride (PVC), polyethylene terephthalate (PET), polytrimethylene terephthalate (PTT), latex, styrene butadiene rubber, or any combination thereof. It is contemplated that the conventional nylon of the primary backing can be, for example and without limitation, nylon 6/6, nylon 6, nylon 10, nylon 10/10, nylon 10/11, nylon 11, and the like. Additionally, the primary backing can comprise natural fibers, such as cotton, wool, or jute. In exemplary embodiments, the primary backing can comprise one or more biodegradable materials, including, for example and without limitation, polylactic acid (PLA).

In exemplary embodiments, the primary backing may include from about 0 wt % to about 100 wt % polyester or from about 0 wt % to about 100 wt % polypropylene. Thus, in these embodiments, it is contemplated that the primary backing may include at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, at least 85 wt %, at least 90 wt %, or at least 95 wt % of polyester. It is further contemplated that the primary backing may include at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, at least 85 wt %, at least 90 wt %, or at least 95 wt % of polypropylene. In some embodiments, the primary backing includes blends of PP and polyester in any of the following ratios of PP:polyester—5:95; 10:90; 50:50; 90:10; 95:5 or any ratio that is within these ranges of ratios.

The primary coating may include polyurethane, latex, hot melt adhesive, and/or thermoplastics alone or in combination. Suitable hot melt adhesives include, but are not limited to, Reynolds 54-041, Reynolds 54-854, DHM 4124 (The Reynolds Company P.O. Greenville, S.C., DHM Adhesives, Inc. Calhoun, Ga.). Suitable thermoplastics include, but are not limited to polypropylene, polyethylene and polyester. The primary coating may also include a filler such as coal fly ash, calcium carbonate, iron oxide, or barium sulfate, or any other filler known in the art. The primary coating may include from about 0 wt % to about 100 wt % polyurethane, from about 0 wt % to about 100 wt % latex, from about 0 wt % to about 100 wt % hot melt adhesive, and/or from about 0 wt % to about 100 wt % thermoplastic. Thus, the primary coating may include at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, at least 85 wt %, at least 90 wt %, or at least 95 wt % of polyurethane. It is further contemplated that the primary coating may include at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, at least 85 wt %, at least 90 wt %, or at least 95 wt % latex. It is further contemplated that the primary coating may include at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, at least 85 wt %, at least 90 wt %, or at least 95 wt % hot melt adhesive. It is still further contemplated that the primary coating may include at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, at least 85 wt %, at least 90 wt %, or at least 95 wt % thermoplastic. The primary coating may include from about 0 wt % to about 80 wt % filler. Thus, the primary coating may include at least 5 wt %, at least 10 wt %, at least 15 wt %, at least 20 wt %, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, or at least 75 wt % filler. In some embodiments, the primary coating includes polyurethane, latex, or thermoplastic and from about 20 wt % to about 80 wt % filler, or from about 40 wt % to about 60 wt % filler. In other embodiments, the primary coating includes hot melts and from about 0 wt % to about 50 wt % filler, or from about 1 wt % to about 25 wt % filler.

Synthetic turf may also include an infill material dispersed among the upstanding ribbons, which acts as a ballast and/or contributes to the physical properties of the turf, such as resiliency, that make the turf suitable for a particular use. Synthetic turf infill may be made of any material suitable for providing desired physical properties for the synthetic turf, but most often includes materials such as sand, gravel, cork, polymer beads, and rubbers, including but not limited to crumb rubber, ethylene propylene diene monomer (EPDM) rubber, and neoprene rubber.

As used herein, "reclaimed synthetic turf material" refers generally to any material obtained from a prior manufactured synthetic turf product. The prior manufactured synthetic turf product can be a post use or post consumer product recovered from a point of original installation. Alternatively, the reclaimed synthetic turf material can be a pre-consumer product, such as manufacturing remnants or quality control failures.

The reclaimed synthetic turf material can, for example, be face fiber material, primary backing material, primary coating material, secondary coating material, secondary backing material, filler, infill material, or any combination thereof. Depending on the component part(s) of synthetic turf reclaimed, it should be appreciated that reclaimed synthetic turf material can include any one or more of the materials described above as being used in the manufacture of conventional synthetic turf.

In addition to fibrous reclaimed carpet material described above, it should be appreciated that reclaimed carpet material and reclaimed synthetic turf material can further comprise one or more impurities. For example, representative impurities that can be present include dirt, sand, oil, inorganic filler, and other conventionally known waste materials that can be present in reclaimed carpet or synthetic turf material.

As summarized above, the present invention provides a variety of methods for using reclaimed synthetic turf material in the manufacture of second generation products. These methods provide alternative avenues for disposing of reclaimed synthetic turf materials in a manner that significantly reduces or can even eliminate the need to send the material to landfill sites. According to some embodiments of the invention, these methods provide ways in which reclaimed synthetic turf material can be integrated into second generation flooring covering products, such as synthetic turf or grass, polyurethane foam pads, fiber pads, carpets, underlays, backing materials, and other textile products. In other embodiments, these methods provide ways in which reclaimed synthetic turf material can be integrated into construction and building products, insulation panels, foam skirting, microcellular foam seals and gaskets, durable elastomeric wheels and tires, electrical potting compounds, high performance adhesives and sealants, spandex fibers, seals, and gaskets.

The methods described herein may be used to recycle and reuse reclaimed synthetic turf material, including any of the synthetic turf materials described above, or other synthetic surfaces having chemical make-up similar to synthetic turf. To that end, embodiments of this invention provide methods of recycling and reusing an existing synthetic turf or a portion of an existing synthetic turf. Other embodiments of this invention provide infill for a synthetic turf wherein the infill is recyclable and can be incorporated into a synthetic turf such that the synthetic turf may be recycled and reused.

By recycling and incorporating reclaimed synthetic turf material into such products, several advantages can be realized. For example, second generation products incorporating the reclaimed material have less of an environmental footprint relative to traditional materials, comprising only virgin materials. In a further embodiment, the use of reclaimed synthetic turf material reduces the amount of traditional, often environmentally harmful materials that previously were sent to landfill, while still providing the same or similar level of product performance. Still further, substitution of virgin material with reclaimed synthetic turf material can reduce the manufacturing costs associated with producing various first generation products. Additionally, the incorporation of reclaimed synthetic turf material into a second generation product can also provide mechanical reinforcement or stability to the second generation product. For example, the dimensional stability and tear resistance of a backing material can be enhanced by the incorporated reclaimed synthetic turf material therein.

In some embodiments, the process of reclaiming a post use or post consumer synthetic turf begins at the point of installation. For a typical sports field, the synthetic turf is commonly installed by unrolling a roll of synthetic turf, such as, for example, a 15 foot wide by 150 foot long roll of turf. A field typically requires multiple rolls, which are laid out on the field side by side and seamed together to form the field. Once seamed together, infill is then installed. The infill may be one or more of sand, rubber, and/or any other suitable material as previously described above. When a synthetic turf is removed from a point of installation, typically at least a portion of the infill is separated from the turf. The infill may be removed prior to the removal of the turf, at the same time, or even after the turf has been removed. For example, a machine may collect the infill and place it into a container or onto the field. The turf and infill may be removed at the same time by a machine or by hand.

After removal of the infill material, the face fibers of the synthetic turf material can optionally be sheared from the primary backing material. By first shearing the face fibers, it will be appreciated that a more substantially homogenous source of reclaimed turf material can be reclaimed and shipped for subsequent use or processing. As described above, the sheared face fibers will typically comprise polyethylene, polypropylene, nylon, or other materials singly or in combination. The remaining carcass material, comprised primarily of primary backing, precoat, filler, secondary backing, and residual face fibers can also be collected and shipped for subsequent recycling processes.

Whether the face fibers are first sheared from the carcass or the entire turf (including face fibers and backing materials) is removed intact, the recovered turf can optionally be downsized from the initial roll size into smaller sections (e.g., 1 by 1 foot for ease and efficiency of shipping) that can be accepted by the next processing step in the reclamation process. The downsizing may be accomplished by hand or machine. The machine may be large or small and may, for example, use rotary blades or knifes or any of a variety of different methods known in the art. The downsized pieces, also referred to as turf fragments, can be placed on pallets and shipped to a recycling facility.

Optionally, fines can be removed from the recovered turf using conventional cleaning equipment. The cleaning equipment can comprise, for example and without limitation, step cleaners, willows, cyclone separators, vertical vibrating chutes, horizontal vibratory screeners, multi-aspirators, rotary sifters, condensers and other methods of cleaning. In use, the cleaning equipment uses air flow to pass fibers across one or more screens. The holes in the screens are too small for the fiber to pass through, but large enough for fines and other contamination to pass through when vacuum is applied. Manufacturers of exemplary cleaning equipment include Dell Orco & Villani Srl, Vecoplan, Wilson Knowles and Sons Ltd, Southern Mechatronics, Signal Machine Company Inc, Kice Industries Inc, Sterling Systems Inc, Pallmann GmbH, OMMI SpA, Pierret Industries Sprl, eFactor 3 LLC, Tria SpA, Weima America Inc, SSI Shredding Systems Inc, Erko-Trützschler GmbH, and LaRoche SA, among others.

Following the optional fines removal process, the sized reduced turf fragments are suitable for use as a component in the manufacture of a variety of second generation products. For example, products that can be made using reclaimed synthetic turf material include resilient planks, resilient tile, resilient sheet goods, carpet tile, carpet tile backing, artificial turf backing, needlebond carpet backing, tufted carpet backing, knitted carpet backing and woven carpet backing. To that end, exemplary methods that can be used to convert recycled extrudate into flooring products can include calendaring, thermofixation, thermosetting, stacked thermal press, hot melt application, heated double belted press, compression molding, profile extrusion, sheet extrusion, powder impression molding, rope gelling, extrusion coating or injection molding. The use of artificial turf as a recycled material allows new products to be made via up-cycling with significant post consumer content, which can also reduce costs of the new product.

In some embodiments, prior to use in the manufacture of new products as described above, the downsized pieces of synthetic turf can optionally be subjected to an agglomeration process by feeding the turf fragments into an agglomerator. Suitable agglomerators include Condux agglomerators, Netplasmak NPS agglomerators, or tub densifiers. The downsized pieces of turf should be of a size suitable for agglomeration. A suitable size will depend on the agglomeration equipment employed. For example, agglomerating equipment such as a Condux can accept sizes of up to 2 square feet. In some embodiments, the synthetic turf fragments are equal to or less than about 1 square foot. In some embodiments, the turf fragments are less than 6 square inches. In some embodiments, the turf fragments are less than 3 square inches.

The step of agglomerating the turf fragments involves using mechanical energy to densify the components of the turf fragments into smaller and denser granules. During agglomeration, some of the synthetic turf components are mechanically melted. In some embodiments, no heat is added during agglomeration; however, frictional forces cause the lower melting components to melt. Lower melting components include any components that melt as a result of the mechanical mixing during the agglomeration process, and in some embodiments include polyethylene and polypropylene. Agglomeration may also include further reduction in the size of the turf fragments, and particularly of the high melting components. For example, in some embodiments polyurethane does not melt, but is reduced to a powder. During agglomeration, higher softening components, such as polyurethane and rubber, may be encapsulated by the lower melting components. The rate of agglomeration depends on a variety of factors including at least the size of the turf fragments and the composition of the turf fragments. In some embodiments the rate of agglomeration is from about 50 to about 2000 lbs/hour, or from about 100 to about 500 lbs/hour, or from about 250 to about 350 lbs/hour. In one embodiment, the agglomeration process produces granules of agglomerated material. These granules have the same or very similar chemical composition as the starting synthetic turf fragments.

As an example of the agglomeration process, in one embodiment, downsized material (i.e. turf fragments) is fed into the Condux machine by hand or by belt into a shredder which cuts the turf fragments into smaller pieces. The shredder uses a rotary blade inside a steel box to cut the downsized material into smaller pieces. These smaller pieces are then transferred to a holding box where the material falls through a screen which allows through only pieces of a set size or smaller. The larger pieces are blown back to the shredder to be further downsized. As the material passes through the screen it is fed into a screw or auger which feeds the material between two steel plates that face each other, one twists and the other is stationary. The plates are shaped to have room in the center and are close together at the edge which generates friction and heat to soften the material. As the material softens it combines with any other material present. The combination of materials is pushed out of the plates as a strand or in small pieces which can be further downsized if needed. No heat is added during the process; however, the material can reach temperatures ranging from approximately 250° F. to 400° F. due to the mechanical energy. The agglomerated pieces are transferred to a screen for sizing. Those that pass through are boxed. The larger agglomerated pieces are sent to another shredder and then collected. The agglomerated material may be in the form of granules.

As one of ordinary skill in the art can appreciate, subjecting synthetic turf fragments to an agglomeration process adds an additional manufacturing step and cost. The process basically loosely fuses thermoplastic materials together into an irregular and inconsistent granular format. Due to the irregular shape and lower density, shipping weights are reduced adding cost for moving the product from one place to another. Since each agglomerated sphere is secured by a slight melt of its outer surface which creates a loose, open, partially melted outer skin, dimensional stability is reduced. The agglomerated post consumer turf produces spheres or coarse irregular shaped granules that lack density control. Their cross-section has a high degree of porosity and air voids further reducing the overall density. Thus, in order to avoid these drawbacks of agglomeration, in other embodiments of the invention the downsized pieces of synthetic turf are not subjected to an agglomeration process.

In exemplary embodiments, a method of using reclaimed synthetic turf material to manufacture a second generation product can be provided. In these embodiments, the method comprises reclaiming one or more synthetic turf materials. The method further comprises extruding the one or more reclaimed synthetic turf materials into a desired form. The method still further comprises incorporating the extruded synthetic turf materials into a selected product, thereby forming the second generation product.

Thus, in some embodiments, it is contemplated that synthetic turf fragments, whether agglomerated or not, can be fed into an extrusion process, either directly or indirectly. The step of extruding the agglomerated turf material may be carried out with any equipment suitable for extrusion. A number of different extruders may be used for this process depending upon the type of mixing or heating that is desired. Examples of suitable extruders include single screw and twin screw extruders. The twin screw extruder may have co-rotating or counter rotating screws and the single screw extruder has one rotating screw. The screws can be designed to do a multitude of things but having the capacity to heat and mix the material is essential. Extruders typically have variable screw speeds and variable heating as well as variable feed rates. The appropriate speed and heat rate is determined by the type of output desired. In some embodiments it may also be desirable to utilize additional feed systems, such as a crammer feed device, for conveying the turf fragments to the extrusion process.

Extrusion is carried out at elevated temperatures. In some embodiments the temperature during extrusion is between about 200° F. and about 650° F., or between about 250° F. and about 450° F. In some embodiments the temperature during extrusion is between about 350° F. and about 400° F. In some embodiments the rate of extrusion is from about 3 to about 5,000 lbs/hour, or from about 100 to about 500 lbs/hour, or from about 300 to about 500 lbs/hour. Extrusion can be carried out using any size die that will provide a product of the desired size, but in some embodiments is carried out using a die that is between about 102 and about 305 mm in diameter. As one having ordinary skill in the art will appreciate, the rate of extrusion and the size of the die will vary depending upon the composition of the particular polymer being extruded.

In some embodiments, the extrusion process can be used, for example, to provide a resulting extrudate in the form of a strand, ribbon, pellet, continuous fiber, extrusion coating, sheet, and the like. These and other forms of extrudate can be stored as desired for future use. For example, an extruded strand of reclaimed turf material can be chopped into a ribbon, pellet, pillows, bricks, briquette, wafer, or other shape. It is also contemplated that an extrudate provided in the form of a continuous large denier fiber can be chopped as desired into a short fiber and subsequently packaged into bales, super sacks, or gaylords Still further, it is contemplated that an extrudate can be ground into a powder having any desired particle size distribution. The shape and size of the extrudate is not of particular importance as a variety of process may be employed converting the extrudate into various end products. As such, after conversion into the extrudate, the primarily thermoplastic material present in the turf material can then be used alone or in various blends to produce, for example, flooring products ranging from resilient planks, resilient tile, carpet tile backing, artificial turf backing, needlebond carpet backing, tufted carpet backing, woven carpet backing and resilient sheet goods.

In still further embodiments, the extrusion process can be used to extrude the reclaimed material directly into or onto a final product as part of the manufacturing process of that product. For example, the extrusion process can be used to apply an extrusion coating of reclaimed synthetic turf material as a backing layer in the manufacture of carpet, carpet tiles, resilient tiles, artificial turf, needle bond carpet, tufted carpet, knitted carpet, and woven carpet.

As one of ordinary skill in the art will appreciate, polyethylene and polypropylene commonly found in synthetic turf components have relatively low melt points which allow for easy processing at temperatures below the melt points of other thermoplastic polymers, such as nylon 6, nylon 66, polyester and PTT. In many cases, this allows the olefins to become a low melt binder that can continue to use the fibrous properties of the higher melt point materials. Lower melt point polymers also use less energy to convert the recycled substrates in to another state, such as hard surface materials like backing or sheet goods. Further these polymers offer flexibility and strength after converting to a solid hard surface state.

In some embodiments functional or non-functional additives can optionally be blended with the turf fragments during the extrusion process. The addition of optional additives enables the manufacture of engineered extrudates having specific predetermined formulations. Exemplary additives include colorants, foaming agents, elastomers, viscosity modifiers, compatibilizers, chain extenders, surfactants, blowing agents, cross linkers, antimicrobial agents, flame retardants, light stabilizers, fillers and the like. In some embodiments, these additives may aid in extrusion of either the agglomerated or non-agglomerated turf material and/or impart desired properties to the extruded product. Accordingly, in one embodiment of the present invention the disclosed method further includes the step of optionally adding fillers, modifiers, or other additives. These additives may be added prior to or during the extrusion process. When the additives are added prior to extrusion, they can be premixed with the turf fragments or agglomerated turf fragments and added to the extruder. In other embodiments, the additives may be added during extrusion. One of skill in the art can determine for a given process, whether it is advantageous to add the additives prior to or during extrusion. One factor in this determination may be the type of extruder used. For example, twin screw extruders can efficiently mix turf fragment material and additives together during extrusion.

Fillers may include but are not limited to calcium carbonate, aluminum oxide trihydrate (alumina), calcined clay, wollastonite, coal fly ash, iron oxide, or barium sulfate, or other fillers known in the art. With high loading of fillers such as $CaCO_3$ and others, the end product becomes more rigid and the surface becomes higher in Shore hardness. A harder surface makes for a better wear layer for application of an image and wear layer to protect the image layer.

Modifiers, colorants, or other additives that are suitable for use with the present invention include, but are not limited to, plasticizers, elastomers, compatibilizers, colorants, antimicrobials, and UV stabilizers. Examples of modifiers that can be used are: wax; EPDM rubber; high and low density polyethylene; high and low density polypropylene. The use of modifiers or elastomers can further enhance the flex properties.

Suitable colorants include dyes and pigments; red, green, blue, black or any number of different colors can be added. However, in some embodiments, colorants may have very little effect due to the dark nature of the material.

In exemplary embodiments, a method of using reclaimed synthetic turf to manufacture a composite polyurethane foam is provided. In these embodiments, the method comprises one or more synthetic turf materials. The method further comprises substantially homogenously blending the one or more synthetic turf materials with one or more polyurethane foam-forming compositions. The method still further comprises curing the substantially homogenous blend of the one or more synthetic turf materials and the one or more polyurethane foam-forming compositions such that the composite polyurethane foam is formed. In exemplary applications of the method, a reclaimed synthetic turf material as described herein can be incorporated into virgin polyurethane foam to form a composite polyurethane material comprising reclaimed synthetic turf material distributed within the polyurethane foam.

In some embodiments, the method comprises providing a frothed and uncured polyurethane foam precursor composition, comprising a substantially homogenous blend or mixture of reclaimed synthetic turf material and one or more polyurethane foam-forming components. In exemplary embodiments, the one or more polyurethane foam-forming components can comprise an isocyanate component and a polyol component. This frothed blend can then be cured under conditions effective to set and form a composite polyurethane foam comprising reclaimed synthetic turf material distributed within the cured foam. The use of reclaimed turf material in such a polyurethane composite product reduces the amount of virgin polyurethane required, and thus reduces the environmental footprint of the composite material. Additionally, the reclaimed turf material can also provide structural reinforcement to the polyurethane foam.

Virgin polyurethane foams disclosed herein can be any conventional flexible polyurethane foam commonly used, for example, in connection with floor covering products. Exemplary formulations suitable to provide the composite foams of the present invention include those formulations disclosed and described in U.S. Pat. No. 5,104,693 (the entire disclosure of which is incorporated by reference herein). In formulations of this type a isocyanate component is typically reacted with a polyol component to form the polyurethane polymer. In addition, additives such as catalysts, surfactants, blowing agents, cross linkers, antimicrobial agents, flame retardants, light stabilizers, and inorganic fillers can also be used to control and modify the reaction process and performance characteristics of the resulting polyurethane polymer. Exemplary inorganic fillers can include, for example, aluminum oxide trihydrate (alumina), calcium carbonate, barium sulfate or mixtures thereof. An exemplary formulation can comprise at least one isocyanate reactive polyol material having an average equivalent weight of about 1,000 to about 5,000 daltons; from about 0.5 to about 3 parts water per hundred parts of polyol, from about 0.01 to about 3.5 parts urethane catalyst per hundred parts of polyol, and from 1 to 2 part surfactant per hundred parts of polyol.

In addition to the flexible polyurethane foam formulations exemplified above, the polyurethane compositions of the present invention can be formulated to provide a wide range of desirable properties, such as rigidity or stiffness, hardness, and density. Thus, polyurethane is ideally suited for use in a wide range of materials, including carpets and textiles, high resiliency flexible foam seating, rigid foam insulation panels, foam skirting, microcellular foam seals and gaskets, industrial seating, automotive seating, golf cart seating, tractor seating, durable elastomeric wheels and tires, electrical potting compounds, high performance adhesives and sealants, Spandex fibers, seals, gaskets, carpet cushions and underlays, and hard plastic parts.

In a still further embodiment, reclaimed synthetic turf material, such as fluff or fragments generated from shredding, tearing or grinding reclaimed synthetic turf, provides an excellent medium for molded products when combined with polyurethane binders or foam. By blending the reclaimed synthetic turf material together with a binder or polyurethane foam forming compositions, the combination can be charged into various molds. A catalyst can then trigger or activate the polyurethane forming compositions to polymerize and thereby form a rigid molded product with a fibrous non-directional substructure or endoskeleton. Still further, the same material can be used to provide a fiber reinforced exoskeleton for coating any type of vessel where a protective barrier is desirable, such as a fuel tank.

According to various embodiments, it is further contemplated that polyurethane and reclaimed synthetic turf material composite foams disclosed herein, whether formulated to be rigid or flexible, can be used for a variety of applications, including for example, synthetic brick pavers, stepping stones, parking stops, curbs, protective column bumpers, and landscape products such as a mulch replacement matt, foundation skirting, car interior panels, hurricane board, garage doors, trim boards, soffit board, wall board, dashboards, an artificial wetland matrix, mulch, playground surface, storage tank protective insulation or outer layer, tree rings, tree wrap, shoe components, and the like.

With respect to flooring products, carpet cushion or underlay, for example, is typically made primarily from polyurethane foam, fiber or rubber. The type and thickness of cushion can vary according to market needs. For example, bedrooms, dens, lounge areas and other rooms with light or moderate traffic can utilize thicker and softer cushion, while living rooms, family rooms, hallways, stairs and other heavy traffic areas can utilize thinner, firmer cushion. Generally, the purpose of carpet pad is to provide warmth and buffer noise. A firm and resilient carpet cushion is useful to form a good foundation for the carpet, while also increasing its comfort and extending its life by acting as a shock absorber. The cushion or underlay also helps buffer sound and provides increased insulation, typically making a room quieter and warmer.

When selecting a polyurethane carpet cushion or underlay, the carpet manufacturer's designations for thickness and density are typically matched to the specifications of the carpet pad. Improper selection of carpet cushion can negatively affect carpet appearance, cause wrinkling and buckling, separation of the carpet seams, and even a breakdown of the carpet structure itself, as well as other problems. Unfortunately, producing polyurethane cushions and underlays, and varying the composition, thickness, and density of polyurethane cushions and underlays to meet constantly changing market needs can yield to recycling challenges, often resulting in the disposal of slow-degrading polymers and other fibers and fillers that are difficult to recycle.

The composite polyurethane foam of the present invention can comprise any variation or combination of reclaimed synthetic turf material, as described above. Similarly, the uncured composite polyurethane foam precursor composition can be formulated such that the reclaimed synthetic turf material is present in the composite polyurethane foam in any desired amount, including for example an amount in the range of from greater than 0% to 95% by weight of the resulting composite polyurethane foam, including exemplary amounts of about 5%, 10%, about 15%, about 20%, about 25%, about 30%, about 35%, about 40%, about 45%, about 50%, about 55%, about 60%, about 65%, about 70%, about 75%, about 80%, about 85%, and about 90% by weight, as well as any exemplary ranges derived from these exemplary amounts. In still further embodiments, the reclaimed synthetic turf material can be present in an amount within any range derived from the above values, including for example, an amount in the range of from greater than 0 weight percent to 90 weight percent, from 30 weight percent to 70 weight percent, or from 40 weight percent to 60 weight percent.

In one embodiment, the frothed and uncured polyurethane foam precursor composition can be provided by first providing a liquid mixture comprising the isocyanate component and the polyol component. The desired amount of reclaimed synthetic turf material can then be introduced and blended with the combined isocyanate component and the polyol component to provide a substantially homogenous blend. This resulting blend can then be frothed. Alternatively, the liquid mixture of isocyanate component and polyol component can be frothed prior to being blended with reclaimed turf material. In still further embodiments, the reclaimed turf material can be pre-blended with a polyurethane forming component, such as the isocyanate or polyol component, prior to blending these components together to form the precursor composition. According to this embodiment it should be noted that the polyol component is often less reactive and chemically sensitive than the isocyanate component and therefore may in certain instances be the preferred component for pre blending with the reclaimed turf material.

As used herein, it should be understood that the step of frothing can be performed by chemical means, including for example the use of conventional chemical gas forming or blowing agents, including, for example and without limitation, water. Alternatively, the step of frothing can also be performed by mechanical means, including for example, through agitation or mechanically introducing gas into the mixture. In still further embodiments, it should be understood that the step of frothing can be performed by a combination of chemical and mechanical frothing techniques. In an exemplary embodiment, the step of frothing can be performed by a combination of partial mechanical frothing and partial chemical frothing.

The uniform blending of the reclaimed turf material into composite polyurethane foam precursor composition can be useful to create a consistent quality foam composite. To that end, several different methods can be employed for obtaining this substantially homogeneous blend level. Using batch-wise methods, the homogenous blend of reclaimed synthetic turf material and the polyurethane forming components can be obtained by the use of a large mixing vessel, such as for example a static mixer. In another embodiment, the reclaimed synthetic turf material can be dispersed into a polyurethane stream. For this embodiment, a large blending auger or lightening mixer can help achieve a homogenous reclaimed turf material/polyurethane mix. In a further embodiment, layers of scattered reclaimed turf material can be dispersed between layers of polyurethane. For this embodiment, blending can be enhanced by using a mixing auger. In another embodiment, a vessel can be filled with a desired amount of shredded reclaimed turf material fluff. Multi-pronged polyurethane nozzles can then inject polyurethane into the fluff, thereby evenly distributing the foam with the fiber. In a further embodiment, polyurethane can be sprayed onto layers of reclaimed turf material within a stainless steel vessel. In another embodiment, a homogeneous mix of the reclaimed turf material and polyurethane can be created by evenly distributing the reclaimed synthetic turf material through applying the reclaimed turf material from a conveyor or auger feeder a vessel. In this embodiment, as the reclaimed turf material falls off of the conveyor or feeder toward the vessel, the polyurethane can be sprayed into the fall of the reclaimed turf material, thereby forming a blend.

Once the frothed uncured composite polyurethane foam precursor composition has been provided, it is cured under conditions effective to set and form the composite polyurethane foam The conditions effective to set and form the composite polyurethane foam can vary, in part, based upon the specific polyurethane formulation used and will be readily determined by one of ordinary skill in the art without requiring any undue experimentation. Further, it should be understood that in most instances the conditions effective to cure will not comprise heating the mixture to a temperature that would meet or exceed the melting point of the reclaimed turf material present in the frothed homogenous blend. To that end, in one exemplary embodiment, the method conditions effective to cure the uncured polyurethane foam precursor composition comprise heating the homogenous blend at a temperature of from about 250° F. to about 300° F. for about 3 to 5 minutes. In an exemplary embodiment, the heating can be achieved by the use of a conventional gas-fired or oil-fired oven. However, it is contemplated that the heating can be achieved by the use of any known heating means, including, for example and without limitation, moisture or steam.

In an exemplary batchwise process, a frothed homogenous blend of polyurethane forming components (isocyanate and polyol components) and reclaimed turf material provided in a large vessel can be steam heated to fully cure the multi-component mixture into a large bun. When steam is used, it can provide that added benefit of an anti-microbial effect. After fully curing, the bun can then be removed from the vessel and placed on a cutting machine for shaping and sizing such as by spiral slicing to provide a composite polyurethane foam sheet having a predetermined thickness.

In other embodiments, the composite polyurethane foams can be prepared in a continuous fashion. For example, a premixed reclaimed turf material and polyurethane slurry can be deposited on a moving machine belt which is capable of releasing the finished processed article. A suitable example is the Saint Gobain Chemfab series PTFE coated fiberglass belts. Doctor blades, rolls, and/or additional belts can be used to then conform the deposited slurry to the desired composite thickness. As the deposited slurry is conveyed on the moving belt, it can be heated to again cure the frothed slurry and to form the resulting composite foam. In still another embodiment, cross-lapping or air-laying techniques can be used to continuously place reclaimed synthetic turf material onto a moving process belt, scrim or film prior to impregnating the film with a polyurethane foam on the continuous production line. This technique uses the eddy current effect of the polyurethane precursor composition to evenly and intimately mix and disperse reclaimed turf material throughout the polyurethane precursor composition before being conveyed for example to the pinch point between two rolls or belts used for setting overall pad thickness.

According to embodiments of the invention, the polyurethane foams can be provided having any desired physical performance properties. For example, as noted above, the polyurethane foam comprising reclaimed synthetic turf material can be formed within a mold of any desired configuration. Similarly, foam sheet material can also be prepared having any desired thickness, including for example, a thickness in the range of from 0.1 inches to 7 inches, including thicknesses of about 0.5 inches, about 1.0 inch, about 2.0 inches, about 3.0 inches, about 4.0 inches, about 5.0 inches, about 6.0 inches, or any range of thicknesses derived from these values. Alternatively, the polyurethane foam can be provided as a large bun that is subjected to a large, batch process for slicing the foam into a desired size and shape. Still further, the polyurethane foam can be produced having any desired volumetric density, including for example, densities in the range of from 0.5 to 25 pounds per cubic foot. In still further embodiments, the foam can have a volumetric density greater than 2.0 pounds per cubic foot; greater than 3.0 pounds per cubic foot; greater than 4.0 pounds per cubic foot; greater than 5.0 pounds per cubic foot; greater than 6.0 pounds per cubic foot; greater than 7.0 pounds per cubic foot; or greater than 8.0 pounds per cubic foot. Such foam pads are useful for various carpet underlayments, attached carpet backings, carpet tiles and attached cushions.

In another embodiment, the present invention provides methods whereby reclaimed turf material can be used to manufacture non-woven fiber pads and fiber batts. In exemplary embodiments, a method of using reclaimed synthetic turf to manufacture a fiber pad can comprise reclaiming one or more synthetic turf materials. The method can further comprise applying the one or more synthetic turf materials and a binder onto a substrate, thereby forming a non-woven fiber layer. The method can still further comprise heating the non-woven fiber layer at a temperature sufficient to melt the binder, thereby forming the fiber pad.

These fiber pads and batts can be prepared for example by conventional cross-lapping, carding, needle punching, thermoforming, or airlaying techniques or any combination thereof, whereby a reclaimed turf material and a low melt binder component is distributed onto a substrate, such as a moving belt, to form a non-woven layer of fiber. The low melt binder component can be preblended with the reclaimed synthetic turf material prior to forming the non-woven fiber layer. Alternatively, the low melt binder component can be added separately after formation of the non-woven fiber layer. Still further, the low melt binder component can be present as a component provided within the reclaimed turf material and thus eliminating the need for any added low melt binder component. Once formed, the non-woven layer of reclaimed turf material and low melt binder is then heated at a temperature sufficient to melt the binder and fuse the reclaimed turf fibers to form a dimensionally stable fiber pad or batt.

The non-woven fiber pads and batts can be prepared from any fibrous reclaimed turf material described herein. In an exemplary embodiment, the reclaimed turf material comprises shredded reclaimed post consumer synthetic turf fibers, including for example, polymeric turf fibers. Exemplary polymeric turf fibers include without limitation nylon 6/6, nylon 6, nylon 10, nylon 10/10, nylon 10/11, nylon 11, polyester, polypropylene, polyethylene, polyurethane, polyvinyl chloride, polyethylene terephthalate, polytrimethylene terephthalate, latex, styrene butadiene rubber, polylactic acid (PLA) and other biodegradable polymers, or any combination thereof. It is contemplated for example that polypropylene, when present in the turf fibers, can be beneficially used as low-melt content for fusing surrounding higher melt fibers together. It is still further contemplated that the polypropylene present in turf fibers can enhance the effect of singeing during the creation of an optional slip surface. Additionally, it is contemplated that turf fibers can be pre-dyed or pigmented with color for improving the aesthetic appearance of the fiber pad. It is further contemplated that the turf fibers can inherently possess stain resistant properties for improving cosmetic retention. It is still further contemplated that turf fibers can comprise spin finish lubricants for easing processing through machinery.

The reclaimed synthetic turf material can be present in the composite fiber pads or batts in any desired amount, including for example an amount in the range of from greater than 0% to 100% by weight of the resulting composite pad or batt, including exemplary amounts of about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, and about 95%, as well as any amounts falling within ranges derived from these listed exemplary amounts. In still further embodiments, the reclaimed turf material can be present in an amount within any range derived from the above values, including for example, an amount in the range of from greater than 0 weight percent to 90 weight percent, from 30 weight percent to 70 weight percent, or from 40 weight percent to 60 weight percent.

In still further embodiments, a fiber pad can be made out of a predetermined or selectively chosen thermoplastic fiber type which can improve the ease of further recycling of the fiber pad, i.e., recycling a component reclaimed material more than once. For example, a fiber pad or batt can be entirely comprised of nylon 6 fiber that can be recycled back into caprolactam. The caprolactam can then be polymerized back into nylon 6 fiber for re-extrusion into carpet fiber and continuously recycled thereafter.

In an additional embodiment, the non-woven fiber layer can comprise a desired amount of at least one low-melt material which is configured to melt at a low temperature relative to surrounding, higher-melt materials therein the fiber pad while leaving the higher-melt materials intact. As one having ordinary skill in the pertinent art will appreciate, upon the application of sufficient heat to a non-woven fiber layer comprising low-melt material, the low-melt material can melt and flow onto adjacent fibers. As one having ordinary skill in the pertinent art will further appreciate, after the low-melt material is re-cured, adjacent fibers therein the fiber pad are effectively adhered or fused together, thereby providing additional dimensional stability to the fiber pad. Typical manufacturers of low-melt materials as described herein include Wellman, Inc., Fiber Innovations, Inc., Huvis Corp., Tuntex Textile Co., Ltd., Stein, Inc., Reliance Industries, Ltd., and Teijin, Ltd. In one embodiment, the at least one low-melt material can comprise a relatively fine denier low-melt material.

In another embodiment, the at least one low-melt material can comprise a low-melt fiber, including, for example and without limitation, low-melt polyester, polypropylene, polyethylene, copolyester, copolymer nylons, engineered olefins, conjugate filament-linear low-density polyethylene, acrylics, low-melt nylon, and the like. As one having ordinary skill in the pertinent art will appreciate, the heating of a low-melt fiber in a fiber pad can create globules of low-melt polymer at crossover points where the low-melt fibers intersect with higher-melt fibers. In an additional embodiment, the at least one low-melt material can comprise glycol-modified polyethylene terephthalate (PETG).

In a further embodiment, the at least one low-melt material can comprise an elastomeric low-melt fiber, including, for example and without limitation, ethylene vinyl acetate (EVA), thermoplastic elastomers (TPE), thermoplastic rubbers, thermoplastic olefins, and the like. As one having ordinary skill in the pertinent art will appreciate, the heating and re-curing of elastomeric low-melt fibers can create stretchable crossover points where the elastomeric low-melt fibers intersect with higher-melt fibers, thereby improving the load-bearing capabilities of the fiber pad.

In an additional embodiment, the at least one low-melt material can comprise a bi-component fiber having a portion of high- or standard-melt material and a portion of low-melt polymer. In this embodiment, the bi-component fiber configuration can be, for example and without limitation, islands-in-the-sea, side-by-side, core-sheath, and the like. As one having ordinary skill in the pertinent art will appreciate, bi-component fibers can maintain their original structural integrity while also allowing each fiber to glue itself to adjacent fibers. As one having ordinary skill in the pertinent art will further appreciate, the use of bi-component fibers increases the amount and strength of bonding between adjacent fibers due to the increased length of axial contact between the fibers. It is contemplated that any known materials having appropriate melt characteristics can be used to form the bi-component fibers.

In a further embodiment, the at least one low-melt material can comprise a low-melt powder, flake, or granule. It is contemplated that any of the above-referenced materials can be provided in a powder, flake, or granule form. In one embodiment, scattering machines can be used to evenly disperse the low-melt powders, flakes, and granules throughout a substrate. Manufacturers of these conventional scattering machines include TechnoPartner Samtronic, Technoboard, Caritec, and Schott Meissner.

In one embodiment, the desired amount of the at least one low-melt material can range from about 0% to about 80% of the total amount of material present within the fiber pad or batt, more preferably from about 5% to about 60% of the total amount of material in the pad or batt, and most preferably from about 10% to about 40% of the total amount of material in the fiber pad or batt. In an exemplary embodiment, the at least one low-melt material can have a denier from about 0.1 to about 30, more preferably from about 0.5 to about 15, and most preferably from about 1 to about 5. As one having ordinary skill in the pertinent art will appreciate, the presence of low-melt material in these amounts can prevent the fibers of the non-woven fiber layer from bundling up, thereby permitting more efficient cutting of the fiber pad. It is contemplated that the at least one low-melt material can have any denier that is appropriate for a particular application, including any denier ranging from about 1 to about 1,500.

Exemplary fiber pads can be produced at relatively high heat and pressure wherein no low melt binder is separately added, to produce a pressed fibrous sheet material comprised of reclaimed turf. In the absence of a low melt binder, a high percentage of polypropylene post consumer carpet can be added and heated to approximately 430° F., thereby beginning to melt the polypropylene within the reclaimed turf material, which can then serve as a binder replacement material. The resulting flow of the polypropylene material can provide a sheet composite thoroughly impregnated with post consumer carpet. In still further embodiments, reclaimed synthetic turf material fibers can be used as a binder by melting the turf material at a temperature above about 475° F. The requisite temperature for this process will generally depends on the fiber types present in the reclaimed turf material.

Optionally, the non-woven fiber layer can comprise a desired amount of spray-on binder liquids, including, for example and without limitation, acrylics, water-dispersed thermoplastics, cross-linked thermosets, polyurethanes, polymerizable compounds, and the like. As one having ordinary skill in the pertinent art will appreciate, upon exposure to elevated temperatures, these binders can crosslink, polymerize, and drive off water or solvents. As one having ordinary skill in the pertinent art will further appreciate, after exposure of the binders to elevated temperatures, residual portions of the binders can bond adjacent fibers together to improve the dimensional stability of the fiber pad. It is contemplated that these binders can be applied to the non-woven fiber layer using any spray-on techniques as are conventionally used in the pertinent art.

The resulting fiber pads and batts as described herein can be manufactured to have any desired thickness and weight per square yard of material. For example, a fiber pad can be manufactured having a thickness in the range of from about 0.10 inches to about 7 inches, more preferably from about 0.15 inches to about 2 inches, and most preferably from about 0.20 inches to about 1 inch. Similarly, the weight per square yard of fiber pad can also be selectively controlled by varying the sizes and types of materials used to produce the fiber pad, as well as the thickness of the fiber pad as discussed above. For example, a fiber pad can be manufactured having a weight per square yard in the range of from about 5 ounces per square yard to about 100 ounces per square yard, more preferably from about 15 ounces per square yard to about 90 ounces per square yard, and most preferably from about 20 ounces per square yard to about 80 ounces per square yard.

In still a further embodiment, the fiber pads described herein can have any desired volumetric density, wherein a desired weight per unit of area is provided in connection with a desired fiber pad thickness. For example, the fiber pad can have any desired density in the range of from 0.5 to 25 pounds per cubic foot. In still further embodiments, the fiber pad can have a volumetric density greater than 2.0 pounds per cubic foot; greater than 3.0 pounds per cubic foot; greater than 4.0 pounds per cubic foot; greater than 5.0 pounds per cubic foot; greater than 6.0 pounds per cubic foot; greater than 7.0 pounds per cubic foot; or greater than 8.0 pounds per cubic foot.

The fiber pads and batts described herein can also be customized to provide any desired color profile. A desired color profile can for example be created by pre-coloring the low melt components of the fiber pad. In another embodiment, the color profile can be created by heat-fusing a colored fiber to an outer surface of the fiber pad. In an additional embodiment, the color profile can be created by spraying colored ink or dye onto at least one surface of the fiber pad using conventional ink jet spraying means. In still another embodiment, the color profile can be created by applying a uniform scrim to the top layer of the fiber pad and then applying a colored adhesive to the top layer. In a further embodiment, the color profile can be created by applying a colored film as a top or bottom layer of the fiber pad.

A finished fiber pad or batt as described above can optionally undergo further processing to provide one or more additional features depending upon the desired end use application. For example, it is contemplated that a face layer or cosmetic layer can be applied to either the top surface, the bottom surface, or both top and bottom surfaces of the formed fiber pad or batt. The additional face layer can be, for example and without limitation, a non-woven fabric, a non-woven scrim, a non-woven fiber layer, thermoplastic open mesh, netting, film, adhesive film, impregnated low-melt powder, impregnated low-melt fiber, a needle punched fabric, a tufted carpet, or any combination thereof. The face layer can itself comprise any desired amount of reclaimed synthetic turf material as described herein. As one having ordinary skill in the pertinent art will appreciate, the addition of the face layer can improve the dimensional stability of the fiber pad. The increase in tensile strength resulting from the addition of the face layer can simplify the installation and handling of the fiber pad while consistently maintaining the dimensions of the fiber pad, thereby reducing stretching and thinning of the material. It is further contemplated that the tie layer of the fiber pad can more effectively distribute loads through the fiber pad, thereby improving the compression resistance and compression-set physical properties of the fiber pad. Still further, depending upon the particular material used, an optional face layer can also function as a water-resistant or waterproof barrier between the fiber pad or batt and other elements, such as flooring.

The face layer can be cross-lapped with the underlying fiber pad or batt to provide additional stability. According to this embodiment, it is further contemplated that the face layer can be needle punched to the upper surface of the core layer. In an alternative embodiment, the face layer can be heat-fused or singed with calendar rolls, belted presses, heated platens, air, or other means conventionally used in the pertinent art. It is also contemplated that the face layer can be fused to the desired top or bottom surface of the fiber pad or batt by using low-melt material already present in the face layer or, alternatively, by scattered low melt powders or spray adhesives as are conventionally used in the pertinent art.

Additionally, in a further embodiment, the face layer secured thereto the fiber pad can function as a slip surface. As one having ordinary skill in the pertinent art will appreciate, the presence of a top face layer and/or bottom face layer as described herein can enhance the slip characteristics of the fiber pad by decreasing friction between the fiber pad and adjacent surfaces. For example, the slip surface can be configured to have reduced frictional characteristics, thereby permitting a carpet to slide over the slip surface with minimal drag and reducing disruption of the fiber pad.

In another embodiment, it is contemplated that the fiber pad or batt can be used in combination with a needle punched textile or fabric. Typically, a needle punched textile substrate is not woven, but is made on a loom with hundreds of barbed needles that punch the fibers into the backing giving it, for example, a felt like texture. A needle-punched material typically is formed from a fiber mat which can be either produced online or fed by from a roll to thereby form a continuous pad material. The initial on or off-line mat can be produced, for example, by needling and entangling fibers together to create a 3-dimensional mat structure or by air laying a mixed polymer fiber composition comprising relatively low melt fiber and relatively higher melt fiber. An air laid mat can then be processed through an oven to melt the low melt polymer and to add dimensional stability to the mat by bonding the higher melt fibers together. Low melt powder can also be used to accomplish the same bonding goal. The needle punched textile can then be further needle punched to either a top or bottom surface of an underlying reclaimed synthetic turf material fiber pad or batt. Alternatively, the needle punched face layer can also be attached for example by heat calendaring using a thermoactivated adhesive composition, low melt fiber, low melt powder or low melt film.

In additional embodiments, it is s also contemplated that a fiber pad or batt as disclosed herein can be combined with a thermoplastic foam to provide a composite structure. For example, a fiber pad or batt as described herein can be used as a carrier substrate layer for the formation of an attached polyurethane foam. For example, the fiber pads and batts disclosed herein can be a substitute for the carrier fabric disclosed and described in U.S. patent application Ser. No. 12/619,059 (U.S. Patent Publication No. 2010/0267304), filed Nov. 16, 2009 and titled "Polyurethane Foam Pad And Methods Of Making And Using Same," the entire disclosure of which is incorporated by reference herein. In alternative embodiments, a fiber pad or batt as described herein can be flow impregnated with polyurethane and/or saturated or coated with extruded thermoplastic foams, such as polyethylene or other foam types. The polyurethane foam can be applied or impregnated onto or into the fiber batt, thereby creating the composite structure. Such a material can be more desirable to a user when enhanced by a foam component for foot comfort. In general, a top coating utilizing a continuous coating film, a ribbed coating, a dot matrix coating, and/or a grid like coating can provide structures well suited for use as underlayments.

According to further embodiments, a top or bottom surface of the fiber pad or batt can be processed to provide an integrated raised pile. For example, a formed fiber pad or batt as described above and having a top surface and an opposed bottom surface can be needle punched through either the top or bottom surface so that at least a portion of fibrous recycled turf material is punched from the bottom surface through the opposed top surface thereby forming a raised pile on the opposed surface of the fiber batt.

The fiber pads discussed above can further comprise foam particles, or chunks of foam distributed within a matrix of fibrous reclaimed synthetic turf material. Such pads can be provided for example by needle bonding, hydrolacing or airlay/hotmelt techniques to create a dimensionally stable composite fiber and polyurethane foam based mat. According to this embodiment, the method generally uses shredded chunks of recycled and/or already cured polyurethane chunks that have been needled, hydrolaced or thermally bonded with low melt fiber or powder to create a dimensionally stable substrate with desired resiliency properties. While low melt powder or fiber additives can be used, they are not necessary as the reclaimed turf material usually contains polypropylene fibers which can be substituted for a binder.

The foams, fiber pads, and batts described herein are suitable for use in a variety of applications. According to some embodiments, they can be produced as roll goods and home bar rolls for use as floor coverings in exposition, hospitality, and automotive trunk liner markets. For specific residential applications, it is contemplated that according to other embodiments, they are particularly well suited for use as floor coverings in basements, home gyms, workshops, garages, playrooms, utility rooms, laundry rooms, recreation rooms, decks, patios, and screened-in porches. While flooring underlayments are a particularly useful application for the foam and fiber pads of the present invention, there are a variety of other appropriate uses as well. For example, the physical properties of the foams and pads can be selectively controlled such that they are useful as underlayment for hard surface flooring, sports field underlayments, landscape turf underlayment, backer board, residential tile backing, an MDF replacement, engineered floor underlayment and a non-ceramic eco-tile. In still further embodiments, the reclaimed synthetic turf based foam composites and/or fiber pad composites can be used to replace current secondary backing materials used in the manufacture of broadloom carpets, carpet tile, mats and rugs. According to this embodiment, a composite reclaimed turf based foam or fiber pad can be laminated onto the backing using various methods known in the art, such as hot melting, flame lamination, extrusion coating, pressure sensitive adhering, and the like. Various woven and nonwoven scrims can also be added as needed or desired for additional dimensional stability.

In still other embodiments, the present invention provides recycled infill for use with synthetic turf. In exemplary embodiments, a method of using reclaimed synthetic turf to manufacture second generation synthetic turf filler can comprise reclaiming one or more synthetic turf materials. The method can further comprise shredding the one or more synthetic turf materials into fibers. The method can still further comprise agglomerating the shredded synthetic turf materials with at least one elastomer, thereby forming a plurality of granules. Still further, the method can comprise selectively downsizing the plurality of granules, thereby forming the second generation synthetic turf filler.

As described above, many synthetic turf products also include an infill material dispersed among the upstanding turf tufts or ribbons. The infill material typically consists of sand, tire rubber crumb, or other particulates, either singularly or in combination with each other. The infill material simulates the soil in natural live grass turf, acts as a ballast, and/or contributes to the physical properties of the turf, such as resiliency, that make the turf suitable for a particular use. Infill also helps support the grass-like tufts helping maintain a vertical orientation. Infill also retains porosity enhancing water drainage of the field. Different methods can be employed for using either reclaimed carpet material or reclaimed synthetic turf material to produce a suitable infill particle for embedding or top dressing into the artificial turf construction.

In one embodiment, a post consumer artificial turf and/or post consumer carpet can first be shredded and cleaned into fibers. The fibers can then be blended with an elastomer through an agglomeration process to provide a granule. The granule can then be size reduced to a small particle. As described above, typical components that may be present in either the post consumer carpet or synthetic turf material include polypropylene, polyethylene, PLA, polyester, wool, nylon 6, nylon 6/6 or PTT (Triexta).

In one exemplary embodiment a tumble coating process or fluidized bed or spray process can be used to add a sealant layer to individual functional particles. The sealant layer can be comprised of thermoset polymers such as polyurethane, molten thermoplastic, water dispersed polymers such as olefin dispersions or solvent dispersed polymer. In a specific exemplary embodiment, tire crumb particles can be encapsulated with an elastomeric sealant coating such as TPO.

Alternatively, coextruded granules can also be formed for use as functional polymeric infill. These granules can be formed from sheath/core, islands in the sea, alternating pie wedges or any other cross-section allowing for partial or full encapsulation of a core material, such as PCC extrudate or tire crumb.

Still further, another embodiment for the manufacture of a recycled infill is to foam a relatively soft thermoplastic materials such as polypropylene, polyethylene, polystyrene, and the like.

Suitable elastomers for use in producing recycled infill can include EVA, PPO, TPE, TPO, Vistamax, polyolefins, Silicone, and the like. Examples of TPE products that come from block copolymers group are Styroflex (BASF), Kraton (Shell chemicals), Pellethane, Engage (Dow chemical), Pebax (Arkema), Arnitel (DSM), Hytrel (Du Pont) and more. While there are now many commercial products of TPE elastomer alloys, these include: Dryflex, Mediprene, Santoprene, Geolast (Monsanto), Sarlink (DSM), Forprene, Alcryn (Du Pont) and Evoprene (AlphaGary). Non elastomeric thermoplastic polymers can also be used including: polypropylene, polyester, nylon 6, nylon 66 or PTT (Triexta), PVC, PLA, Bio-based polymers, polyethylene, LLDPE, LDPE, HDPE, and the like.

Exemplary cleaning equipment can be obtained from Dell Orco & Villani Srl, Vecoplan, Wilson Knowles and Sons Ltd, Southern Mechatronics, Signal Machine Company Inc, Kice Industries Inc, Sterling Systems Inc, Pallmann GmbH, OMMI SpA, Pierret Industries Sprl, eFactor 3 LLC, Tria SpA, Weima America Inc, SSI Shredding Systems Inc, Erko-Trützschler GmbH, LaRoche SA and others. Cleaning equipment can consist of step cleaners, willows, cyclone separators, vertical vibrating chutes, horizontal vibratory screeners, multi-aspirators, rotary sifters, condensers and other methods of cleaning.

In still further embodiments, the present invention provides methods for making a high density composite from reclaimed synthetic turf material. The method generally comprises providing a composite layer of reclaimed synthetic turf material and low melt thermoplastic binder resin and then heating the composite layer at a temperature sufficient to melt the thermoplastic binder resin. The heated composite layer is also subjected to pressure sufficient to substantially consolidate the melted binder and reclaimed synthetic turf material and to form a composite having a desired density and thickness. The formed composite can then be cooled to ambient temperature.

Suitable reclaimed synthetic turf material for forming the composite layer can comprise any one or more of the reclaimed synthetic turf materials described above. For example, in exemplary and non limiting embodiments, suitable reclaimed synthetic turf material comprises fibers of one or more thermoplastic polymers. Exemplary thermoplastic polymers include nylon 6/6, nylon 6, nylon 10, nylon 10/10, nylon 10/11, nylon 11, polyester, polypropylene, polyethylene, polyurethane, polyvinyl chloride, polyethylene terephthalate, polytrimethylene terephthalate, latex, styrene butadiene rubber, polylactic acid (PLA) and other biodegradable polymers, or any combination thereof. In one embodiment, the reclaimed synthetic turf material comprises foam waste. In another embodiment, the reclaimed synthetic turf material does not comprise foam waste. Additionally, the reclaimed synthetic turf material can comprise natural fibers, such as wool or jute. Reclaimed turf material comprising synthetic and/or natural materials described above can optionally be present as a fiber. The reclaimed turf material can also comprise fillers. The fillers can be any suitable filler, including, for example, aluminum oxide trihydrate (alumina), calcium carbonate, barium sulfate or mixtures thereof. The fillers can be virgin, waste material, or even reclaimed fillers.

The reclaimed synthetic turf material can be present in the final high density composite in any desired amount, including for example an amount in the range of from greater than 0% to 100% by weight, including exemplary amounts of about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, and about 95%, as well as any amounts falling within ranges derived from the listed exemplary amounts. In still further embodiments, the reclaimed synthetic turf material can be present in an amount within any range derived from the above values, including for example, an amount in the range of from greater than 0 weight percent to 90 weight percent, from 30 weight percent to 70 weight percent, or from 40 weight percent to 60 weight percent. In still other embodiments, the composite comprises at least about 50% reclaimed synthetic turf material. In another embodiment, the composite comprises from about 50% to about 100% reclaimed turf material.

According to embodiments that comprise less than 100% reclaimed synthetic turf material, other materials can of course be present, including without limitation binder, filler materials such as calcium carbonate, mica, fiberglass, wood, wollastonite (calcium silicate) and talc (magnesium silicate), rubber, other minerals and ground recycled materials.

The reclaimed synthetic turf material can be obtained from various component parts of the prior manufactured carpet product, for example, without limitation, a face layer, an adhesive layer, a precoat layer, a backing layer, a secondary backing layer, an underlayment, a cushioning material, an infill material, or a scrim. Likewise, the reclaimed synthetic turf material can be obtained from a variety of sources. In one example, the reclaimed synthetic turf material can be obtained from a collection site. The collection sites take in post consumer turf which is then shipped to a facility for sorting by fiber type. Once sorted, baled material of the same fiber type is then shipped to a secondary location where various techniques are employed for reducing the large pieces or fragments of turf to small chunks or shredded fiber to provide an amalgamated mixture. After this stage, the product can be used with or without further refinement or processing to remove additional contaminates. Alternatively, the reclaimed turf material can be obtained directly from the point of installation as described above.

Dependent on the end use and desired cost of the composite, the reclaimed synthetic turf material can comprise a coarse blend of ground/shredded reclaimed synthetic turf material or a more refined material containing primarily sheared face fibers. An unexpected benefit of the processes disclosed herein is the use of the coarse slit tape fibers derived from primary and secondary backing materials. The coarse material/fibers provides a low-cost structural material that can serve as reinforcement for the high density composites described herein. In some embodiments, additional processing steps can be desirable. For example, the reclaimed synthetic turf material can be chopped or sheared into fiber or tape yarn lengths of from about $\frac{1}{64}$ inch to about 3 inches.

The structural integrity of the high density composites is generally maintained through the use of a binder, which is melted during the manufacturing process and which aids in the formation of the composite by binding the reclaimed synthetic turf material and optional other components together. In one embodiment, the low melt binder component can be preblended with the reclaimed synthetic turf material prior to forming the composite layer. Alternatively, the low melt binder component can be added separately after formation of composite layer. Still further, the low melt binder component can be present as a component provided within the reclaimed synthetic turf material and thus eliminating the need for any added low melt binder component. Exemplary low melt binders that can typically be present in provided reclaimed synthetic turf material include without limitation a wide variety of poly(olefins), such as polypropylene or polyethylene.

The low-melt binder material is selected to melt at a relatively low temperature relative to surrounding, higher-melt materials within the composite layer so as to leave the higher-melt materials intact. As one having ordinary skill in the pertinent art will appreciate, upon the application of sufficient heat to a composite layer comprising low-melt material, the low-melt material can melt and flow onto adjacent reclaimed synthetic turf material. As one having ordinary skill in the pertinent art will further appreciate, after the low-melt material is re-cured, adjacent materials therein the composite layer are effectively adhered or fused together. Typical manufacturers of low-melt materials as described herein include Wellman, Inc., Fiber Innovations, Inc., Huvis Corp., Tuntex Textile Co., Ltd., Stein, Inc., Reliance Industries, Ltd., and Teijin, Ltd. In one embodiment, the at least one low-melt material can comprise a relatively fine denier low-melt material.

In another embodiment, the at least one low-melt material can comprise a low-melt fiber, including, for example and without limitation, low-melt polyester, polypropylene, polyethylene, copolyester, copolymer nylons, engineered olefins, conjugate filament-linear low-density polyethylene, acrylics, low-melt nylon, and the like. As one having ordinary skill in the pertinent art will appreciate, the heating of a low-melt fiber can create globules of low-melt polymer at crossover points where the low-melt fibers intersect with higher-melt fibers. In an additional embodiment, the at least one low-melt material can comprise glycol-modified polyethylene terephthalate (PETG).

In a further embodiment, the at least one low-melt material can comprise an elastomeric low-melt fiber, including, for example and without limitation, ethylene vinyl acetate (EVA), thermoplastic elastomers (TPE), thermoplastic rubbers, thermoplastic olefins, and the like. As one having ordinary skill in the pertinent art will appreciate, the heating and re-curing of elastomeric low-melt fibers can create stretchable crossover points where the elastomeric low-melt fibers intersect with higher-melt fibers, thereby improving the load-bearing capabilities of the composite.

In an additional embodiment, the at least one low-melt material can comprise a bi-component fiber having a portion of high- or standard-melt material and a portion of low-melt polymer. In this embodiment, the bi-component fiber configuration can be, for example and without limitation, islands-in-the-sea, side-by-side, core-sheath, and the like. As one having ordinary skill in the pertinent art will appreciate, bi-component fibers can maintain their original structural integrity while also allowing each fiber to glue itself to adjacent fibers. As one having ordinary skill in the pertinent art will further appreciate, the use of bi-component fibers increases the amount and strength of bonding between adjacent fibers due to the increased length of axial contact between the fibers. It is contemplated that any known materials having appropriate melt characteristics can be used to form the bi-component fibers.

In a further embodiment, the at least one low-melt material can comprise a low-melt powder, flake, or granule. It is contemplated that any of the above-referenced materials can be provided in a powder, flake, or granule form. In one embodiment, scattering machines can be used to evenly disperse the low-melt powders, flakes, and granules throughout a substrate. Manufacturers of these conventional scattering machines include TechnoPartner Samtronic, Technoboard, Caritec, and Schott Meissner.

The at least one low-melt binder material can be present in the final high density composite in any desired amount, including for example an amount in the range of from greater than 0% to 100% by weight, including exemplary amounts of about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, and about 95%, as well as any amounts falling within ranges derived from the listed exemplary amounts. In still further embodiments, the at least one low-melt binder material can be present in an amount within any range derived from the above values, including for example, an amount in the range from about 0% to about 80% of the total amount of material present within the composite, alternatively from about 5% to about 60% of the total amount of material in the composite, or still alternatively from about 10% to about 50% of the total amount of material in the composite. In an exemplary embodiment, the at least one low-melt material can have a denier per foot from about 0.1 to about 30, more preferably from about 0.5 to about 15, and most preferably from about 1 to about 5. However, it is contemplated that the at least one low-melt material can have any denier that is appropriate for a particular application, including any denier ranging from about 1 to about 1,500.

The disclosed high density composites can be manufactured to have a wide variety of sizes, shapes, and densities. Generally, the composites have a high density. In one embodiment, the composite has a density of from about 5 to about 100 pounds per cubic foot, including exemplary densities of about 10, about 15, about 20, about 25, about 30, about 35, about 40, about 45, about 50, about 55, about 60, about 65, about 70, about 75, about 80, about 85, about 90, and about 95 pounds per cubic foot, as well as any densities falling within ranges derived from the exemplary listed densities. In still further embodiments, the volumetric density can a value within any range derived from the above values, including for example, a density of from about 15 to about 75 pounds per cubic foot.

The composites can generally have any desired shape. In one embodiment, the composite is substantially planar. Planar composites can be useful for floor coverings, such as underlayments, or decking material, wall boards, and the like. The planar composites can be manufactured into any desired size, which will generally depend on the targeted application. For example, it is contemplated that the composites can be cut into any size that is conventionally used in dimensional lumber. In one embodiment, the planar composite can have a length dimension greater than a width dimension. For example, the planar composite can be sized as a sheet, for example, a 4 foot×8 foot sheet. Such a sheet can be cut into smaller sizes as needed. In other embodiments, the composites can be sized into, for example and without limitation, a 4 inch×8 foot composite, a 4 inch×10 foot composite, or other elongate lengths. Elongate composites can be useful, for example, as decking materials. The composites can also have any desired thickness. In one embodiment, the composite has a thickness of from about 0.25 inches to about 3 inches, or 0.5 inches to 1.0 inches, or from about 0.25 inches to about 0.75 inches, or from about 0.6 inches to about 0.75 inches. In a further embodiment, the composite can have a suitable shape and dimension commonly used in floor tile, wall tile, ceiling tile, including but not limited to dimensions such as 1 inch×1 inch, 2 inches×2 inches, 3 inches×3 inches, 3 inches×5 inches, and the like. Other shapes include diamond, rectangles, triangles, rounds and other shapes.

The disclosed composites can also contain face embossing to provide visuals and textures to duplicate wood grain, slate and other visuals commonly seen in floor covering. Laser etching can also be utilized in lieu of embossing to achieve the desired aesthetics. Some other potential methods for texturing the surface of wall board, flooring materials or roofing products include drag wiring while the temperature of an extruded product is still above glass transition temperature or dragging probes across the surface while the product or probe is moving. Further, a texture can be embedded in the surface of an injection mold, compression mold or vacuum form mold, as well. A texture can also be hot or cold stamped with pressure for creating the desired look. In another embodiment stamped and embossed exterior wall board can be used in lieu of natural wood, vinyl siding, or composite cement and fiber plank siding.

In another embodiment, synthetic shingles using reclaimed synthetic turf material can be obtained utilizing stamped molding or vacuum molding with a cutting press. An additional layer of fiberglass can be added as a backer material to impart dimensional stability or sandwich between dual sheets of composite reclaimed synthetic turf material stock. Interlocking tabs can be useful for attaching each panel or each dimensioned shape together as the rigidity of the material provides excellent strength and impact resistance.

In still a further embodiment, it is contemplated that the composites of the present invention can replace convention vinyl and resilient sheet flooring backing, plank backing, or tile backing. According to this embodiment, the composite can comprise reclaimed synthetic turf material as a base carrier with optional additional components such as organic or inorganic color pigments, mica, minerals, glass or other substances to impart surface aesthetics. In an additional embodiment an aesthetic layer such as a thin veneer of slate, ceramic, stone, wood, cork, printed image, or a film or nonwoven material can be adhered to a substrate. For this embodiment, an additional wear layer can be useful to provide a protective cap or finish for foot traffic or to enhance durability. The glue can be from hot melt adhesive, extrusion coating, flame lamination, pressure sensitive adhesive, thermoplastic powder or post consumer carpet fibers that have been reactivated or other adhesive technologies. Adhesive materials can be thermoplastics (such as polypropylene, nylon 6, nylon6,6, polyester, PTT, or polyethylene), acrylic, polyurethane or any other common adhesive technology.

The disclosed composites can be provided by various methods. In one embodiment, the composite is made through a belt driven conveyer process, which can be either continuous or discontinuous (batch). An exemplary apparatus 100 suitable for making the composites is partially shown in FIG. 1. As shown, a lower moving belt reaches a material loading zone 120, and the reclaimed synthetic turf material 135 is applied to the lower belt. The reclaimed material can be applied through a number of means, for example through a silo (125 as shown in FIG. 1) which releases the reclaimed material onto the lower belt at a desired rate. The reclaimed synthetic turf material can be applied to a belt in the form of fibers, flakes, granular material, and the like. The reclaimed material can be reduced to flake size by various means including cutting, shredding, slicing, chopping, tearing or a combination thereof.

Depending on how the reclaimed material is applied to the belt, it can be desirable to evenly distribute the reclaimed material across the belt through a suitable process, such as carding, cross lapping, or fiber scattering, among others, to thereby form a composite layer (140 in FIG. 1). Optionally, a low melt thermoplastic binder resin can be added to the composite layer. When a low melt binder is desired, for example, the reclaimed synthetic turf material can be conveyed either mechanically or pneumatically to a low melt binder applicator. In this embodiment, application of the binder to the reclaimed synthetic turf material can be accomplished by suspending the reclaimed material in swirling air and spraying the binder directly or by creating an atomized atmosphere through which the binder moves, or both. Generally, the amount of binder to be applied to the reclaimed material will depend on the type of binder used and the desired cohesive strength.

With reference again to FIG. 1, once the composite layer is formed on the lower belt 115, an upper belt 135 can be used to convey the material to other processing zones. In one embodiment, the lower belt 115 and the upper belt 135 can be used to maintain a desired thickness of the composite layer and/or compress and shape the composite layer. In a further embodiment, the distance between the lower and upper conveyor belt is approximately equal to the thickness of the composite to be manufactured, including any of those thicknesses disclosed above.

The upper and lower belts can then convey the composite layer into a heating zone 145, where, for example, the composite layer can be heated using an oven 150, although other heating mechanisms are possible. Depending on the temperature at which the composite layer is heated, the use of heat resistant conveyer belts can be desired. Generally, the composite layer is heated to a temperature sufficient to at least partially melt the low melt binder. Typical low melt binders melt at a temperature of at least about 250° F. In one embodiment, the composite layer is subjected to a temperature of from about 200° F. to about 800° F. to thereby melt the thermoplastic binder. Exemplary non-limiting temperatures at which the low melt binder can be heated include 220° F., 250° F., 280° F., 300° F., 350° F., 400° F., 450° F., 500° F., 550° F., 600° F., 700° F., and 750° F.

Exemplary composites can be produced at relatively high heat and pressure wherein no low melt binder is separately added, to produce a pressed fibrous sheet material comprised of reclaimed synthetic turf. In the absence of a low melt binder, a high percentage of polypropylene containing reclaimed synthetic turf material can be added and heated to approximately 430° F., thereby beginning to melt the polypropylene within the reclaimed synthetic turf material, which can then serve as a binder replacement material. The resulting flow of the polypropylene material can provide a sheet composite thoroughly impregnated with reclaimed synthetic turf material. In still further embodiments, reclaimed synthetic turf fiber can be used as a binder by melting the reclaimed synthetic turf fiber at a temperature above about 475° F. The requisite temperature for this process will generally depends on the fiber types present in the reclaimed synthetic turf material.

During or after the heating step, the composite layer can optionally be subjected to a pressure sufficient to substantially consolidate the melted binder and reclaimed synthetic turf material to form a composite. Generally, suitable pressures range from above 0 to about 1000 pounds per square inch (psi), including for example, from about 100 to 1000 psi, from about 250 to 1000 psi, from about 500 to 750 psi, or from about 600 to 700 psi.

Once the composite is heated and optionally subjected to pressure, the formed composite can then be cooled. As shown in FIG. 1, for example, the upper 135 and lower 115 conveyer belts can convey the formed composite layer to a cooling zone 155, which comprises a cooling chamber 160. It is understood that further steps can be carried out during the process, as desired. For example, the composite can optionally be post pressed, smoothed, embossed or contoured to obtain various functional or aesthetic effects. Additionally, other optional materials can be applied to composite layer or the formed composite during the manufacturing process.

In connection with any of the inventive embodiments described herein, the methods can optionally comprise a sanitization step. As one of skill in the art will appreciate, the presence of impurities in reclaimed turf material can necessitate a need to sanitize the reclaimed materials for health and safety purposes. To that end, the reclaimed turf material can be subjected to a sanitization step at any point during the manufacture of the a foam or fiber pad including, sanitizing the reclaimed turf material prior to its use in the methods described herein or alternatively by sanitizing the reclaimed turf material after formation of a foam or fiber pad.

What is claimed is:

1. A method of using reclaimed synthetic turf material to manufacture a second generation product, comprising:
    shearing face fibers from synthetic turf at a point of installation to provide sheared face fibers and remaining carcass;
    removing the remaining carcass from the point of installation;
    feeding the sheared face fibers into an extrusion device to form an extrudate; and
    incorporating the extrudate into a carpet product, thereby forming a second generation carpet product.

2. The method of claim 1, further comprising downsizing the face fibers prior to the step of forming the extrudate.

3. The method of claim 1, further comprising removing fines from the face fibers prior to the step of forming the extrudate.

4. The method of claim 1, wherein the extrudate is formed at an extrusion temperature between about 200° F. and about 650° F.

5. The method of claim 1, wherein the extrudate is formed at an extrusion rate ranging from about 3 lbs/hour to about 5,000 lbs/hour.

6. The method of claim 1, wherein the extrudate is formed using a die having a desired diameter, and wherein the desired diameter of the die is between about 102 mm and about 305 mm.

7. The method of claim 1, wherein the extrudate is in a form selected from the group consisting of a strand, a ribbon, a pellet, a continuous fiber, an extrusion coating, and a sheet.

8. The method of claim 1, further comprising blending one or more additives with the face fibers prior to forming the extrudate.

9. The method of claim 8, wherein each additive of the one or more additives is selected from the group consisting of a colorant, a foaming agent, an elastomer, a viscosity modifier, a compatibilizer, a chain extender, a surfactant, a blowing agent, a cross linker, an antimicrobial agent, a flame retardant, a light stabilizer, and a filler.

10. The method of claim 8, wherein the one or more additives comprises a filler selected from the group consisting of calcium carbonate, aluminum oxide trihydrate (alumina), calcined clay, wollastonite, coal fly ash, iron oxide, and barium sulfate.

11. The method of claim 2, further comprising agglomerating the downsized face fibers prior to the step of forming the extrudate.

12. The method of claim 1, wherein the step of incorporating comprises directly applying the extrudate onto the carpet product.

13. The method of claim 1, further comprising blending one or more additives with the face fibers during the step of forming the extrudate.

14. The method of claim 1, wherein at least a portion of infill is removed prior to shearing of face fibers.

15. The method of claim 1, wherein the remaining carcass is recycled.

* * * * *